US008583363B2

(12) United States Patent
Abraham et al.

(10) Patent No.: US 8,583,363 B2
(45) Date of Patent: Nov. 12, 2013

(54) DETERMINING ALTERNATIVE ROUTES

(75) Inventors: Ittai Abraham, San Francisco, CA (US);
Daniel Delling, Mountain View, CA (US); Andrew V. Goldberg, Emerald Hills, CA (US); Renato F. Werneck, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 358 days.

(21) Appl. No.: 12/787,412

(22) Filed: May 26, 2010

(65) Prior Publication Data
US 2011/0295497 A1    Dec. 1, 2011

(51) Int. Cl.
*G01C 21/34*    (2006.01)

(52) U.S. Cl.
CPC ..................... *G01C 21/34* (2013.01)
USPC ........... 701/416; 701/400; 701/409; 701/411; 701/417; 701/533; 340/995.19

(58) Field of Classification Search
USPC ......... 701/200, 400, 533, 409, 411, 416, 417; 340/988
See application file for complete search history.

(56) References Cited

U.S. PATENT DOCUMENTS

| | | | | |
|---|---|---|---|---|
| 5,938,720 | A * | 8/1999 | Tamai | 701/533 |
| 6,507,850 | B1 * | 1/2003 | Livshutz et al. | 701/532 |
| 2003/0154023 | A1 | 8/2003 | Utsumi | |
| 2004/0193369 | A1 | 9/2004 | Kokojima et al. | |
| 2009/0099686 | A1 | 4/2009 | Yoshikawa et al. | |
| 2009/0125229 | A1 * | 5/2009 | Peri et al. | 701/201 |
| 2009/0248609 | A1 | 10/2009 | Kawai et al. | |
| 2010/0036606 | A1 * | 2/2010 | Jones | 701/202 |

OTHER PUBLICATIONS

Liu, et al., "An Improved Algorithm for Searching Local Optimal Path in Intelligent Transport System", Retrieved at << http://ieeexplore.ieee.org/stamp/stamp.jsp?tp=&arnumber=4739747 >>, Second International Symposium on Intelligent Information Technology Application, Dec. 20-22, 2008, pp. 157-161.

Delling, et al., "Highway Hierarchies Star", Retrieved at << http://citeseerx.ist.psu.edu/viewdoc/download?doi=10.1.1.97.1788&rep=rep1&type=pdf >>, 9th DIMACS Implementation Challenge, 2006, pp. 1-29.

O'Brien, Michael, "How MapQuest Works", Retrieved at << http://maths.ucc.ie/NewWebsite/Staff%20Profiles/Usher/MapQuest.pdf >>, Feb. 21, 2006, pp. 1-26.

"Cambridge Vehicle Information Technology Ltd", Retrieved at << http://www.camvit.com/ >>, Retrieved Date: Mar. 31, 2010, pp. 1.

"Google Maps", Retrieved at << http://maps.google.com/ >>, Retrieved Date: Mar. 31, 2010, pp. 1.

(Continued)

*Primary Examiner* — Thomas Tarcza
*Assistant Examiner* — Tyler J Lee
(74) *Attorney, Agent, or Firm* — Microsoft Corporation (57) ABSTRACT

Alternative routes to an optimal route may be determined and presented to a user via a computing device. Alternative routes are selected from candidate routes that meet admissibility criteria. In an implementation, admissibility of a candidate route (in order for it to be considered an alternative route) may be determined based on three criteria: "limited sharing", "local optimality", and "stretch" such as "uniformly bounded stretch". Limited sharing refers to the amount of difference between the alternative route and the optimal route, local optimality refers to lack of unnecessary detours, and uniformly bounded stretch refers to a length of the shortest path to travel between two points on the alternative route.

19 Claims, 7 Drawing Sheets

(56) References Cited

OTHER PUBLICATIONS

Abraham, et al., "Highway Dimension, Shortest Paths, and Provably Efficient Algorithms", Retrieved at << http://research.microsoft.com/pubs/115272/soda10.pdf >>, In Proceedings ACM-SIAM Symposium on Discrete Algorithms (SODA10), 2010, pp. 12.

Dantzig, George B., "Linear Programming and Extensions", Retrieved at << http://press.princeton.edu/titles/413.html >>, Retrieved Date: Mar. 31, 2010, pp. 2.

Sanders, et al., "Engineering Route Planning Algorithms", Retrieved at <<http://algo2.iti.kit.edu/schultes/hwy/weaOverviewSlides.pdf >>, Jun. 6, 2007, pp. 88.

Delling, et al., "Pareto Paths with SHARC", Retrieved at << http://i11www.iti.uni-karlsruhe.de/extra/publications/dw-pps-09.pdf>>, In Proceedings of the 8th International Symposium on Experimental Algorithms (SEA'09), Jun. 2009, pp. 12.

"9th DIAMC Implementation Challenge—Shortest Paths", Retrieved at <<http://www.dis.uniroma1.it/~challenge9/>>, Retrieved Date: Mar. 31, 2010, pp. 2.

Dijkstra, E. W., "A Note on Two Problems in Connexion with Graphs", Retrieved at << http://www.math.umn.edu/~armstron/5707/dijkstra.pdf >>, Numerische Mathematik, vol. 1, No. 1, Dec. 1, 1959, pp. 269-271.

Eppstein, David, "Finding the K Shortest Paths", Retrieved at << http://www.ics.uci.edu/~eppstein/pubs/Epp-SJC-98.pdf>>, Mar. 31, 1997, pp. 1-26.

Geisberger, et al., "Route Planning with Flexible Objective Functions", Retrieved at << http://www.siam.org/proceedings/alenex/2010/alx10_012_geisbergerr.pdf >>, Workshop on Algorithm Engineering and Experiments (ALENEX 2010), Jan. 2010, pp. 124-137.

Geisberger, et al., "Contraction Hierarchies: Faster and Simpler Hierarchical Routing in Road Networks", Retrieved at << http://www.springerlink.com/content/j062316602803057/fulltext.pdf >>, Experimental Algorithms, 7th International Workshop, WEA, May 30-Jun. 1, 2008, pp. 319-333.

Gutman, Ron, "Reach-Based Routing: A New Approach to Shortest Path Algorithms Optimized for Road Networks", Retrieved at << http://www.siam.org/meetings/alenex04/abstacts/rgutman1.pdf >>, Jan. 6, 2004, pp. 12.

Martins, Ernesto Queiros Vieira, "On a Multicriteria Shortest Path Problem", Retrieved at << http://ideas.repec.org/a/eee/ejores/v16y1984i2p236-245.html >>, vol. 16, No. 2, May 1984, pp. 2.

* cited by examiner

DETERMINING ALTERNATIVE ROUTES

BACKGROUND

Existing computer programs known as "road-mapping" programs provide digital maps, often complete with detailed road networks down to the city-street level. Typically, a user can input a location and the road-mapping program will display an on-screen map of the selected location. Several existing road-mapping products typically include the ability to calculate an "optimal route" between two locations. In other words, the user can input two locations, and the road-mapping program will compute the travel directions from the source location to the destination location. The directions are typically based on distance, travel time, and certain user preferences, such as a speed at which the user likes to drive, or the degree of scenery along the route. Computing the optimal route between locations may require significant computational time and resources.

These systems produce driving directions by computing a shortest path (or an approximation) with respect to a length function based on various measures, such as distance and travel time. However, optimal routes do not necessarily match the personal preferences of individual users. For driving directions, users may prefer alternatives to optimal (shortest or fastest) routes. These preferences may be based on better local knowledge, a bias for or against a certain route segment, or other factors, and may be unknown to the system One can deal with this issue by presenting a small number of alternative routes and hoping one of them will satisfy the user. However, alternative routes are often provided that are impractical, inefficient, look unreasonable to the user, contain unnecessary local detours, and/or are not much different than the optimal path.

SUMMARY

Alternative routes to an optimal route may be determined and presented to a user via a computing device. Alternative routes are selected from candidate routes that meet admissibility criteria.

In an implementation, admissibility of a candidate route (in order for it to be considered an alternative route) may be determined based on three criteria: "limited sharing", "local optimality", and "stretch" including "uniformly bounded stretch". Limited sharing refers to the amount of difference between the alternative route and the optimal route, local optimality refers the amount (or lack of) unnecessary detours, and uniformly bounded stretch refers to a maximum amount of time to travel between two points on the alternative route. As described further herein, stretch is based on the ratio between the length of an alternative route and the length of an optimal route, and uniformly bounded stretch looks at the stretch of every subpath.

In an implementation, the values of the parameters in one or more of the admissibility criteria may be relaxed or adjusted. Moreover, in an implementation, instead of evaluating all candidate routes to determine whether each is admissible, the candidate routes can be sorted according to some objective function, the routes may be tested in this order, and the first candidate path that is determined to be admissible may be returned as the alternative path. Note that in some cases there may be no admissible path, and no path may be returned.

In an implementation, a subclass of admissible paths, referred to as single via paths, may be used. Single via paths are a concatenation of two shortest paths. Additionally or alternatively, speedup techniques may be used such as those based on contraction hierarchies and reach which are based on pruning Dijkstra's search. Pruning may be performed in order to limit the number of candidate routes that are checked and to find these candidates faster.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there are shown in the drawings example constructions of the embodiments; however, the embodiments are not limited to the specific methods and instrumentalities disclosed. In the drawings.

DETAILED DESCRIPTION

Figure 1:
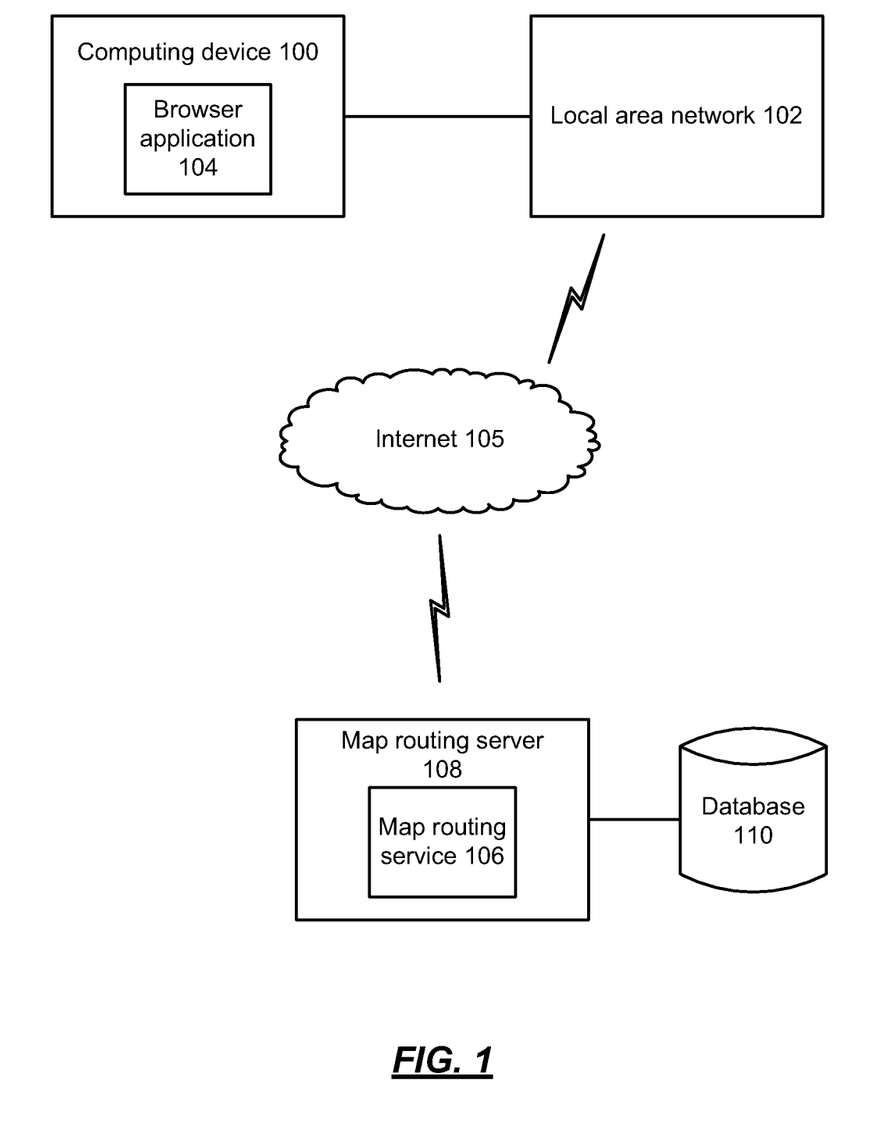
FIG. 1 shows an example of a computing environment in which aspects and embodiments may be potentially exploited.

FIG. 1 shows an example of a computing environment in which aspects and embodiments may be potentially exploited. A computing device 100 includes a network interface card (not specifically shown) facilitating communications over a communications medium. Example computing devices include personal computers (PCs), mobile communication devices, etc. In some implementations, the computing device 100 may include a desktop personal computer, workstation, laptop, PDA (personal digital assistant), cell phone, or any WAP-enabled device or any other computing device capable of interfacing directly or indirectly with a network. An example computing device 100 is described with respect to the computing device 700 of FIG. 7, for example.

The computing device 100 may communicate with a local area network 102 via a physical connection. Alternatively, the computing device 100 may communicate with the local area network 102 via a wireless wide area network or wireless local area network media, or via other communications media. Although shown as a local area network 102, the network may be a variety of network types including the public switched telephone network (PSTN), a cellular telephone network (e.g., 3G, 4G, CDMA, etc), and a packet switched network (e.g., the Internet). Any type of network and/or network interface may be used for the network.

The user of the computing device 100, as a result of the supported network medium, is able to access network resources, typically through the use of a browser application 104 running on the computing device 100. The browser application 104 facilitates communication with a remote network over, for example, the Internet 105. One exemplary network resource is a map routing service 106, running on a map routing server 108. The map routing server 108 hosts a database 110 of physical locations and street addresses, along with routing information such as adjacencies, distances, speed limits, and other relationships between the stored locations.

A user of the computing device 100 typically enters start and destination locations as a query request through the browser application 104. The map routing server 108 receives the request and produces an optimal route among the locations stored in the database 110 for reaching the destination location from the start location. The map routing server 108 then sends that optimal route back to the requesting computing device 100. Alternatively, the map routing service 106 is hosted on the computing device 100, and the computing device 100 need not communicate with a local area network 102.

Any known technique for computing the optimal route may be used. Computing the optimal route, however, is not a trivial task. To visualize and implement routing methods, it is helpful to represent locations and connecting segments as an abstract graph with vertices and directed edges. Vertices correspond to locations, and edges correspond to road segments between locations. The edges may be weighted according to the travel distance, transit time, and/or other criteria about the corresponding road segment. The general terms "length" and "distance" are used in context to encompass the metric by which an edge's weight or cost is measured. The length or distance of a path is the sum of the weights of the edges contained in the path. For manipulation by computing devices, graphs may be stored in a contiguous block of computer memory as a collection of records, each record representing a single graph node or edge along with associated data.

One approach to computing the optimal route (e.g., the shortest path) is to use the method of Dijkstra. In general, Dijkstra's method finds the shortest path from a single "source" vertex to all other vertices in the graph by maintaining for each vertex a distance label and a flag indicating if the vertex has yet been scanned. The distance label is initially set to infinity for each vertex, and represents the weight of the shortest path from the source to that vertex using only those vertices that have already been scanned. The method picks an unscanned vertex and relaxes all edges coming out of the vertex (i.e., leading to adjacent vertices). The straightforward implementation of Dijkstra's method chooses for scanning the unscanned vertex with the lowest distance label. To relax an edge (v,w), the method checks if the distance label for w is greater than the sum of the distance label for v and the actual weight of the edge (v,w). If so, the method updates the distance label for w to equal that sum. It can be mathematically shown that once a vertex has been scanned, its distance label does not subsequently change (when arc lengths are nonnegative). Some implementations further maintain a parent label for each scanned vertex w, indicating the vertex v whose outgoing edge leads to w on the shortest path. When the method is about to scan a vertex, the path defined by the parent pointers for that vertex is a shortest path.

Although Dijkstra's method can be used to compute shortest paths from a source to all other vertices, it can also be used to find a shortest path from a source to a single destination vertex—the method simply terminates when the destination vertex is about to be scanned. Intuitively, Dijkstra's method searches within a circle, the source vertex in the center, increasing the radius of the circle by choosing vertices and scanning them. If a path is sought for a particular destination, the method terminates with the destination on the boundary of the circle. Searching for a shortest path from vertex s to vertex t via Dijkstra's method results in scanning possible vertices in increasing order of their distance from s. The shortest path to any vertex only passes through vertices that have already been scanned. Once the distance and shortest path to vertex t have been determined, the method stops, leaving those vertices who are further distance than t from s. At this point, in the traditional Dijkstra method, all those vertices who are closer distance than t from s have already been scanned.

Thus, in an implementation, given two vertices, s and t, the point-to-point shortest path problem (P2P) is that of finding the shortest path (referred to herein as optimal route and denoted by Opt) from vertex s to vertex t. Dijkstra's algorithm computes dist(s, t) (the distance from vertex s to vertex t in a directed graph G) by scanning vertices in increasing order from vertex s. As is well known, bidirectional Dijkstra (BD) runs a second search from vertex t as well, and stops when both search spaces meet.

The reach of a vertex v, denoted r(v), is defined as the maximum, over al shortest u-w paths (i.e., paths from a vertex u to a vertex w) containing vertex v, of min{dist(u,v), dist(v,w)}. BD can be pruned at all vertices v for which both dist(s,v)>r(v) and dist(v,t)>r(v) hold. The insertion of shortcuts (edges representing the shortest paths in the original graph) may decrease the reach of some original vertices, thus significantly improving the efficiency of this approach. It has been determined that the resulting algorithm, referred to as RE, is three orders of magnitude faster than plain BD on continental-sized road networks.

The well known contraction hierarchies (CH) algorithm is more efficient than RE for some length functions (e.g., by an order of magnitude for transit times). During preprocessing, CH sorts the vertices by importance (heuristically), then shortcuts them in this order. To shortcut a vertex, the vertex is temporarily removed from the graph and as few new edges as needed are added to preserve distances between all remaining (more important) vertices. A query only follows an edge (u,v) of a path P in the graph G (augmented with shortcuts) if vertex v is more important than vertex u. It is noted that given any path P in graph G, the length of P (denoted by l(P)) is the sum of the lengths of its edges.

In addition to determining the optimal route Opt, the map routing service 106 may determine candidate routes, determine alternative routes based on the candidate routes, and provide one or more of the alternative routes to the computing device 100 for presentation to the user, for example. If a candidate route is determined to be "admissible", then that candidate route is an alternative route. Thus, each alternative route is admissible. In an implementation, admissibility of a candidate route (in order for it to be considered an alternative route) may be determined based on three criteria: "limited sharing", "local optimality", and "uniformly bounded stretch". Limited sharing refers to the amount of difference between the alternative route and the optimal route, local optimality refers to the lack of unnecessary detours, and uniformly bounded stretch refers to a maximum amount of time to travel between two points on the alternative route.

As described further herein, an alternative route between vertex s and vertex t is determined that is significantly different from Opt, such that the total length of the edges of the alternative route is only a fraction longer than l(Opt) (the sum of the lengths of the edges of Opt).

Additionally, the alternative route has no unnecessary detours. While proceeding along the alternative route, every local decision makes sense. To formalize this notion, paths of a route are held to be locally optimal. A first condition for a path P to be T locally optimal (T-LO) is that every subpath P' of path P whose length l(P') is less than or equal to T is a shortest path. This would be enough if path P were continuous, but for actual (discrete) paths in graphs, another condition may be used: if l(P') is greater than T, and if l(P'') is less than T (where P'' is the path obtained by removing the endpoints of P'), then subpath P' is a shortest path. Note that a path that is not locally optimal includes a local detour.

Additionally, alternative routes have limited stretch, which means that if any two points on an alternative path are taken, the time to drive the alternative route between those two points is not much larger than that of the optimal route. A path P has stretch (1+∈) if its length is at most (1+∈) times the length of the shortest path between its endpoint. A path P has (1+∈) uniformly bounded stretch ((1+∈)-UBS) if every subpath (including path P itself) has stretch at most (1+∈), where c is a predetermined value.

Thus, in an implementation, a path is an admissible alternative route if it meets three criteria: (1) has limited sharing (e.g., the total length of the edges shared by the optimal route and the alternative route is a low percentage (e.g., 80%, 85%, etc.) of l(Opt), where the percentage is a predetermined value), (2) has local optimality (e.g., has a high local optimality, the alternatives have to be sensible, such that with respect to a subpath of the alternative route, there is no better way of getting from one end of the subpath to the other end), and (3) has a (low) uniformly bounded stretch (UBS). Instead of UBS, the criteria may use a simpler notion of stretch that is based on the ratio between the length of an alternative route and the length of an optimal route, as opposed to UBS which looks at the stretch of every subpath.

In an implementation, an optimization function may be defined that is a linear combination of these three criteria. An alternative route is found with an optimization function such that the alternative route shares at most x% with the optimal route Opt, is at least y% locally optimal, and has a UBS of at most z%, where x, y, and z are predetermined threshold values. There may be zero, one, or multiple admissible alternative routes, depending on the input and the choice of parameters. If there are multiple alternatives, they may be sorted according to some objective function, e.g., which prefers admissible paths with low stretch, low sharing, and high local optimality. Other objective functions could be used as well.

One or more alternative routes may thus be determined and provided to a user. In an implementation, the i-th alternative route is sufficiently different from the union of Opt and the i–1 previous alternative routes (i.e., based on the previous alternative routes and the optimal route Opt). The stretch and local optimality conditions do not change, as they do not depend on other alternative routes.

Figure 2:
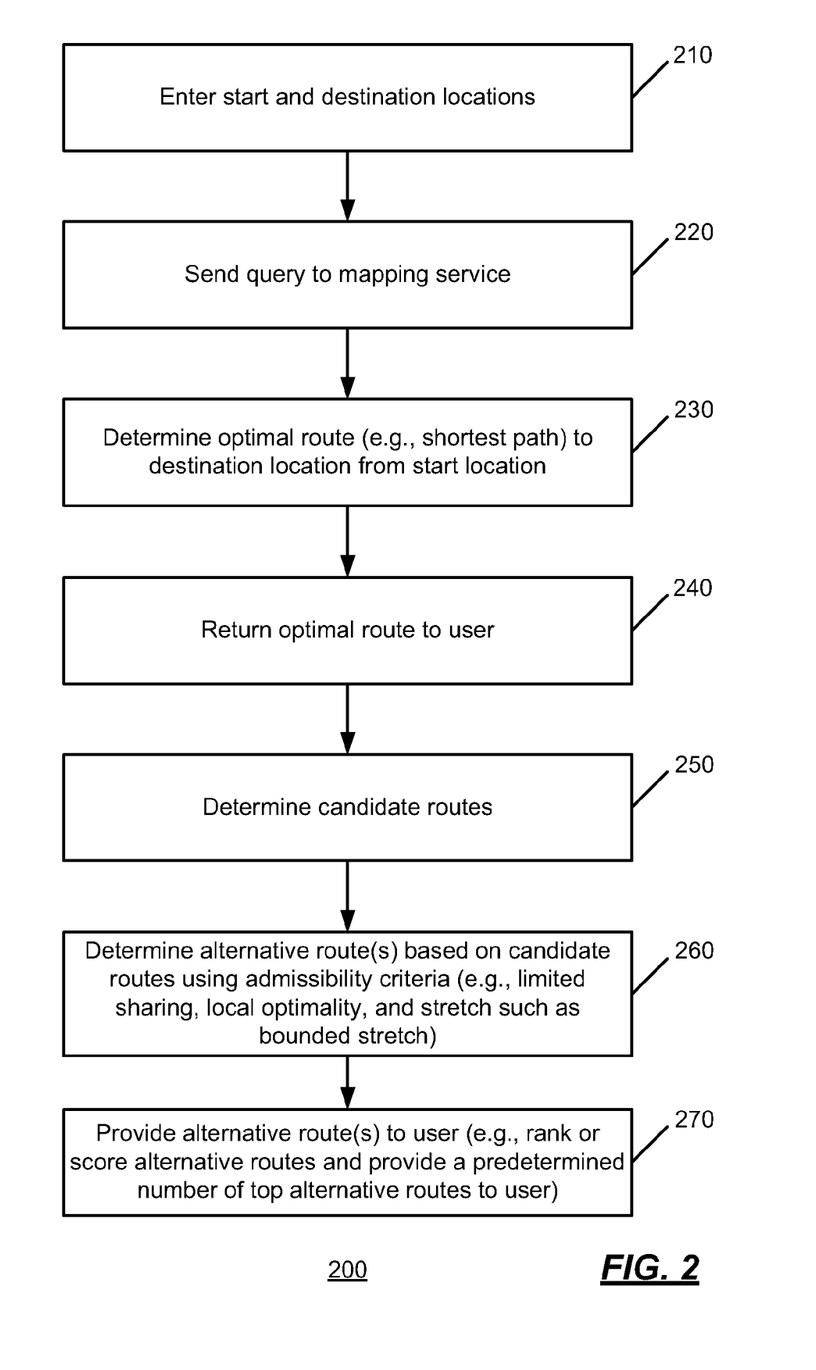
FIG. 2 is an operational flow of an implementation of a method for determining an alternative route between two locations.

FIG. 2 is an operational flow of an implementation of a method 200 for determining an alternative route between two locations. At 210, a user enters start and destination locations (e.g., using computing device 100), and the query is sent to a mapping service (e.g., map routing service 106) at 220. The mapping service uses any known technique, such as those described above, to find an optimal route (e.g., shortest path) to the destination location from the start location at 230. The mapping service may return the optimal route to the user at 240.

At 250, candidate routes (i.e., prospective alternative routes) may be determined using any known technique, including those described herein. One or more of the candidate routes may be subsequently analyzed to determine one or more alternative routes. At 260, an alternative route is determined using the candidate routes. In an implementation, each candidate route is checked against admissibility criteria described herein (e.g., the limited sharing, the local optimality, and the uniformly bounded stretch criteria). In an implementation, a route is admissible if it meets the criteria that it is substantially different from the optimal route, has a small stretch (if any two points on the route are taken, the time to drive between them is not much larger than the optimal route), and is locally optimal (there are no unnecessary detours, with every subpath up to a certain length being a shortest path).

If a candidate route meets the three criteria, then the candidate route is admissible and thus an alternative route. In an implementation, candidate routes are checked for admissibility until the number of alternative routes that are to be returned to the user (e.g., a predetermined number or a user selected number, such as one alternative route, two alternative routes, etc.) are determined. After the number of alternative routes that are to be returned to the user are determined, checking the remaining candidate routes for additional alternative routes ends, and the alternative routes are provided to the user at 270.

Alternatively, every candidate route may be checked for admissibility, and the alternative routes (those candidate routes that meet the admissibility criteria) may be ranked or scored, as described herein, and the top X number of alternative routes based on the ranking or scoring may be determined and provided to the user at 270. The number of alternatives X to be provided to the user may be predetermined or user-selectable via the computing device 100 for example.

Even with the restrictions imposed on admissible routes, they may still be too numerous, making it difficult to find the best alternative route efficiently. In an implementation, for efficiency, a more limited subset of candidate routes may be used in the determination of alternative routes. In an implementation, a subclass of admissible paths, referred to as single via paths, may be used. Single via paths are a concatenation of two shortest paths. Given an origin vertex s and a target vertex t, only single via paths may be considered as prospective alternative routes. Single via paths are alternative routes obtained by concatenating the shortest paths from vertex s to vertex v and from vertex v to vertex t, for some vertex v. Such an alternative route may be determined using the bidirectional version of Dijkstra's algorithm, for example.

Put another way, given any vertex v, the via path $P_v$ through vertex v is the concatenation of two shortest paths, s-v and v-t (recall that s-t paths are being determined). Via paths that are admissible are determined. With respect to single via paths, among all s-t paths through vertex v (for any vertex v), via path $P_v$ is the shortest, i.e., it has the lowest stretch. Moreover, being a concatenation of two shortest paths, the local optimality of via path $P_v$ can only be violated around vertex v. In this sense, via paths are close to being admissible.

Although via paths can be generated with a single run of BD, not all of them must be admissible. For each via path $P_v$, it may be determined whether the admissibility conditions (sharing, stretch, and local optimality) are obeyed.

For sharing, let $\sigma_f(v)$ be the sharing amount in the forward direction (i.e., how much s-v shares with Opt, which is known). Set $\sigma_f(v) \leftarrow 0$ and for each vertex v in forward scanning order, set $\theta_f(v)=\sigma_f(p_f(v))+l(p_f(v),v)$ if v∈Opt or set $\sigma_f(v)= \sigma_f(p_f(v))$ otherwise (here $p_f$ denotes the parent in the forward search). Computing $\sigma_r(v)$, the sharing in the reverse direction, is similar. The total sharing amount is $\sigma(v)=\sigma_f(v)+\sigma_r(v)$.

Stretch and local optimality are more difficult to evaluate, using quadratically many shortest path queries (on various pairs of vertices). For local optimality, a quick 2-approximation may be used. Take a via path $P_v$ and a parameter T. Let P1 and P2 be the s-v and v-t subpaths of $P_v$, respectively. Among all vertices in P1 that are at least T away from vertex v, let vertex x be the closest to vertex v, and let vertex x=vertex s if l(P1)<T. Let y be the analogous vertex in P2, and let vertex y=vertex t if l(P2)<T. $P_v$ passes the local optimality test (T-test) if the portion of $P_v$ between vertex x and vertex y is a shortest path.

Figure 3:
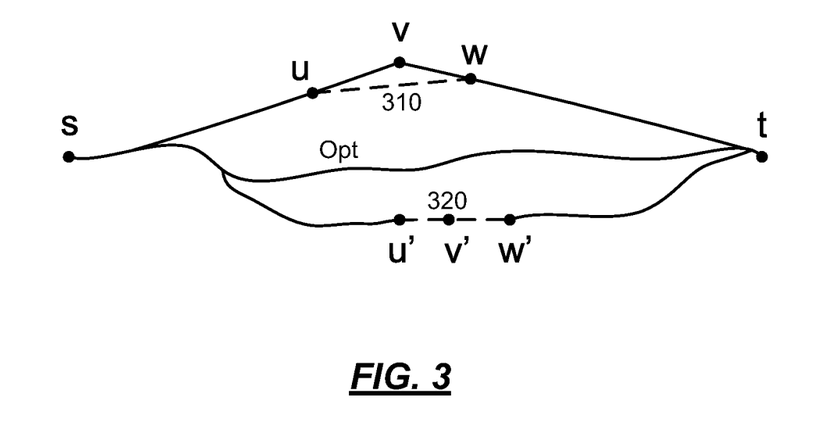
FIG. 3 is a diagram for describing an example of local optimality.

FIG. 3 is a diagram for describing an example of local optimality. In particular, FIG. 3 shows an example for two T-tests. The T-test for vertex v in FIG. 3 fails because the shortest path from vertex u to vertex w, indicated as dashed line 310, does not contain vertex v (the path from vertex u to vertex w through vertex v is not the shortest path from vertex u to vertex w; the dashed line 310 is a shorter path). The test for vertex v' succeeds because the shortest path 320 from vertex u' to vertex w' contains vertex v' (this is an admissible path). Therefore, candidate vertex v may be chosen, and then vertex u and vertex w may be selected or determined based on the location of vertex v and on the local optimality parameter. It may then be determined if vertex u and vertex w make an admissible path (i.e., determine if vertex v is on the shortest path from vertex u to vertex w).

It can be shown that if $P_v$ passes the T-test, then $P_v$ is T-LO, and if $P_v$ fails the T-test, then $P_v$ is not 2T-LO. It has also been determined that if a via path $P_v$ has stretch $(1+\in)$ and passes the T-test for $T=\beta \cdot dist(s,t)$ (with $0<\in<\beta<1$), then $P_v$ is a $\beta/(\beta-\in)$ UBS path.

In an implementation, a BD-based algorithm, referred to as BDV, may be used. It grows shortest path trees from vertex s and into vertex t. Each search stops when it advances more that $(1+\in)l(Opt)$ from its origin (this is the longest an admissible path can be). For each vertex v scanned in both directions, it is determined whether the corresponding path $P_v$ is approximately admissible: it shares at most $\gamma \cdot l(Opt)$ with Opt, has limited stretch $(l(P_v) \leq (1+\in)l(Opt))$, and passes the T-test for $T=\alpha \cdot l(Opt)$, where $\gamma$, $\in$, and $\alpha$ are predetermined values. The best approximately admissible via path according to an objective function may then be outputted.

In an implementation, speedup techniques may be used such as those based on the well known contraction hierarchies and reach which are based on pruning Dijkstra's search. Pruning may be performed in order to limit the number of candidate paths that are checked. Any known pruning technique or algorithm may be used. In an implementation, a technique based on reach may be used in which two shortest paths' trees are built, out of vertex s and into vertex t. Each vertex v scanned by both searches is evaluated as follows. First, perform two P2P queries (s-v and v-t) to find $P_v$. This is used because the distances found by the original bidirectional search may be inaccurate, due to pruning. Then perform an approximate admissibility test on $P_v$, as in BDV. Among the candidate paths that pass, return the one minimizing an objective function. With respect to computing the sharing amount $\sigma(v)$, reach adds shortcuts to the graph, each representing a path in the original graph. To calculate $\sigma(v)$, solve a partial unpacking subproblem: given a shortcut (a,c), with $a \in Opt$ and $c \notin Opt$, find the vertex $b \in Opt$ that belongs to the a-c path and is farthest from a.

To increase the success rate for finding the desired number of alternative paths, a pruning technique can be relaxed. For example, if reach pruning is used, one can multiply reach bounds by a constant greater than one. Relaxed pruning allows a trade-off between the running time and the success rate.

Figure 4:
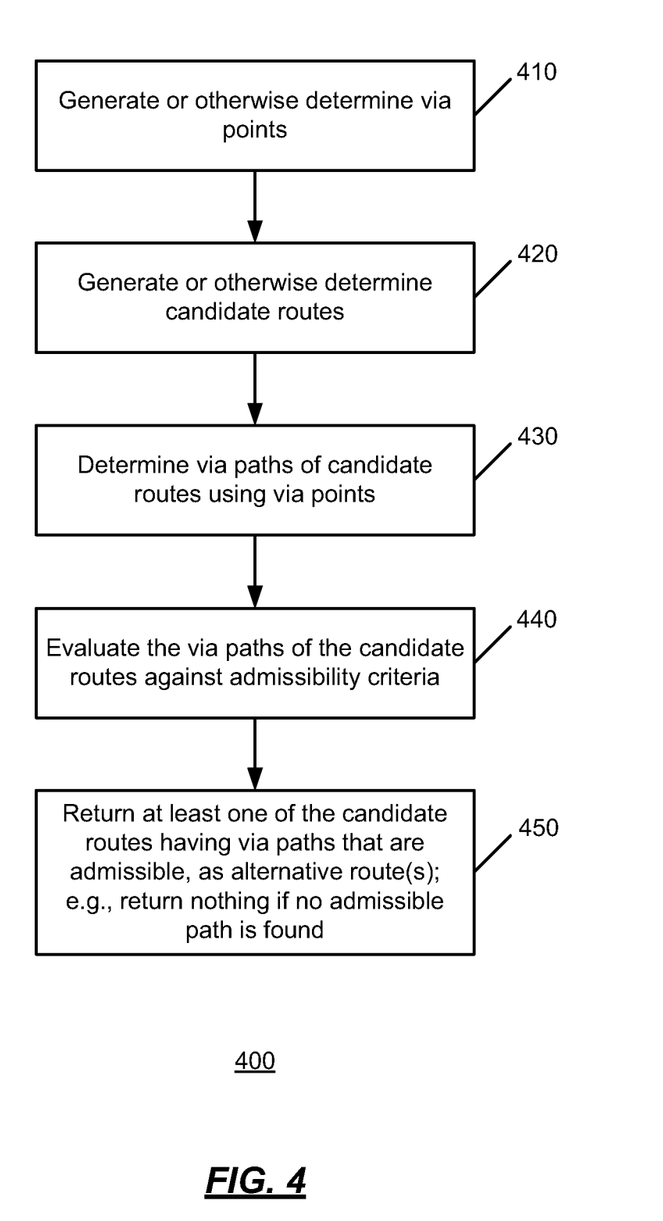
FIG. 4 is an operational flow of another implementation of a method for determining an alternative route between two locations.

FIG. 4 is an operational flow of another implementation of a method 400 for determining an alternative route between two locations. At 410, via points are generated or otherwise determined. In an implementation, a pruned bidirectional Dijkstra algorithm (e.g., reach, highway hierarchies, contraction hierarchies) may be used to find via points. Each via point v gives a path $P_v$ formed by going from the origin to vertex v and from v vertex to the destination along optimal paths.

At 420, candidate routes may be generated or otherwise determined using any known technique or a technique described herein. At 430, via paths of the candidate routes are determined using the via points. At 440, the via paths of the candidate routes may be evaluated against admissibility criteria to determine if the via paths are admissible. In an implementation, the via paths may be evaluated using one or more of the following criteria: (i) local optimality (no sufficiently short subpath is non-optimal), (ii) the length of path $P_v$ compared to that of the optimal route Opt (which has been previously determined), and (iii) the length of the part of path $P_v$ different from the optimal route Opt.

At 450, at least one of the candidate routes having via paths that are admissible may be returned to the user as alternative routes. The maximum number of alternative routes that are computed and/or returned to the user may be predetermined. In an implementation, the admissible candidate route(s) having the best scores may be returned to the user as alternative route(s).

Figure 5:
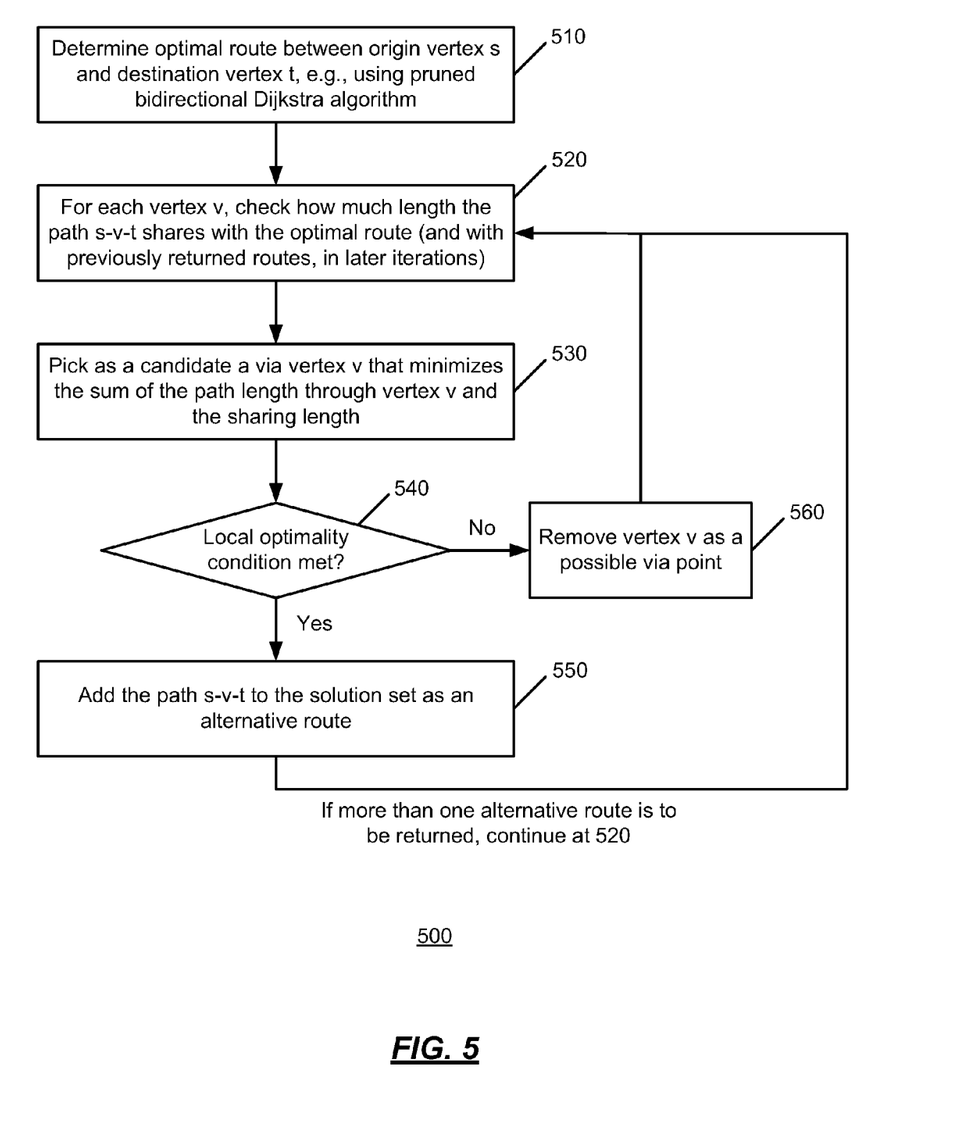
FIG. 5 is an operational flow of another implementation of a method for determining an alternative route between two locations.

FIG. 5 is an operational flow of another implementation of a method 500 for determining an alternative route between two locations. In an implementation, let vertex s be the origin and let vertex t be the destination. At 510, a pruned bidirectional Dijkstra's algorithm may be used to find the optimal route Opt between vertex s and vertex t.

At 520, for each vertex v, check how much length the path s-v-t shares with Opt. At 530, pick as a candidate a via vertex v that minimizes the sum of path length (through vertex v) and the sharing length, where the value of the sharing length is less than a given threshold.

At 540, determine if the local optimality condition is met. This may be performed by choosing points x and y far enough from vertex v at the s-v and v-t subpaths, computing the optimal x-y path, and checking if vertex v is on it. In an implementation, pruning may be used to accelerate the local optimality test (e.g., the T-test). If the local optimality condition is met, at 550, add the path s-v-t to the solution set. If the local optimality condition is not met, at 560, remove vertex v as a possible via point and repeat processing at 520. If more than one alternative is to be returned, repeat processing at 520 and update the sharing values according to all paths in the solution. If the solution set is empty, the algorithm may be applied recursively to subpaths of Opt.

In an implementation, the values of the parameters in one or more of the admissibility criteria may be relaxed or adjusted. Moreover, in an implementation, instead of evaluating all candidate routes to determine whether each is admissible, the candidate routes can be sorted according to some objective function, the vertices may be tested in this order, and the first candidate path that is determined to be admissible may be returned as the alternative path. Thus, the vertices may be assigned a score and sorted by score, and then the first one that is valid is returned as the alternative route. Pruning, scoring, and sorting by score are speedup techniques.

Figure 6:
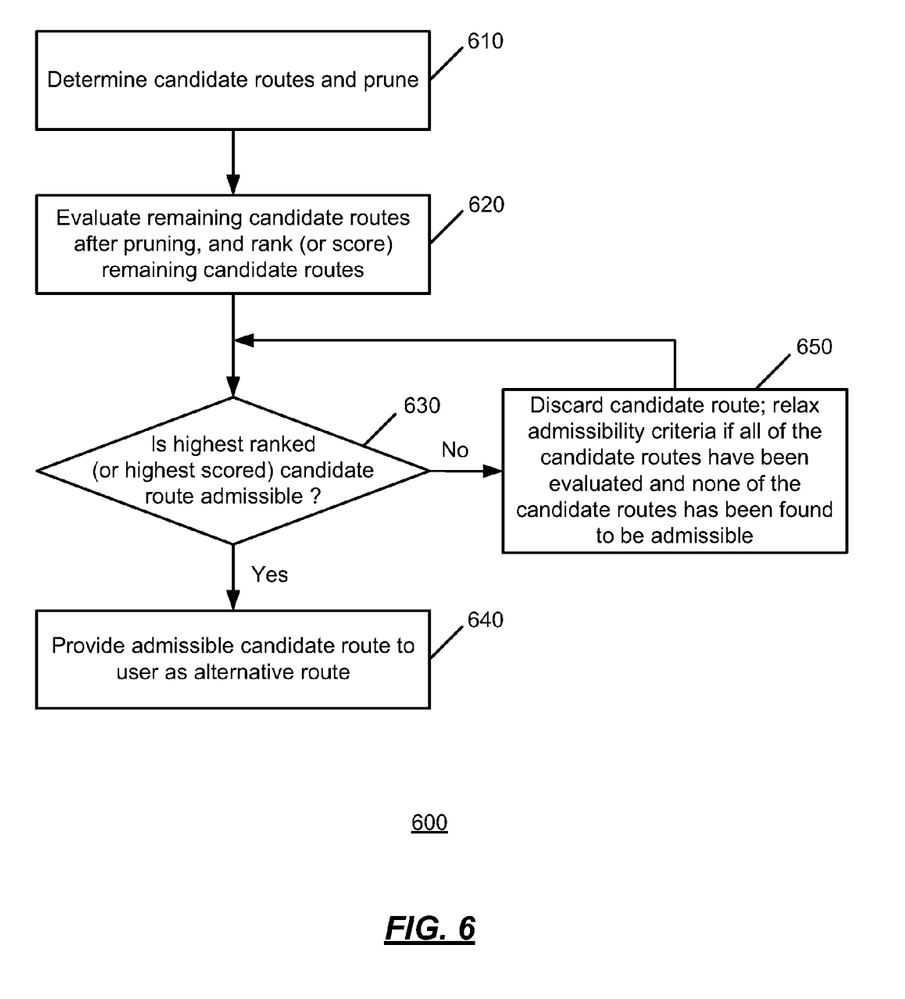
FIG. 6 is an operational flow of another implementation of a method for determining an alternative route between two locations.

FIG. 6 is an operational flow of another implementation of a method 600 for determining an alternative route between two locations. At 610, candidate routes are determined and pruned according to any known technique or a technique described herein. At 620, the remaining candidate routes are evaluated and ranked or scored based on a function.

At 630, the highest ranked (or highest scored) remaining candidate route is analyzed to determine if it is admissible. If so, at 640, then that route is provided to the user as an alternative route. Otherwise, that candidate route is discarded at 650 and processing returns to 630 with the next highest ranked candidate route being chosen. In an implementation, if no candidate routes are admissible, then a relaxed set of admissibility criteria (e.g., changing the parameters, omitting one of the criteria, etc.) may be used at 630.

In an implementation, the candidate routes may be sorted in non-decreasing order according to the function $f(v)=2l(v)+\sigma(v)-pl(v)$, where $l(v)$ is the length of the via path $P_v$, $\sigma(v)$ is how much $P_v$ shares with Opt, and $pl(v)$ is the length of the longest plateau containing v. A plateau is a path that belongs to the shortest path trees from s and into t. Note that $pl(v)$ is a lower bound on the local optimality of $P_v$. By preferring vertices with high $pl(v)$, an admissible route may be found sooner.

Figure 7:
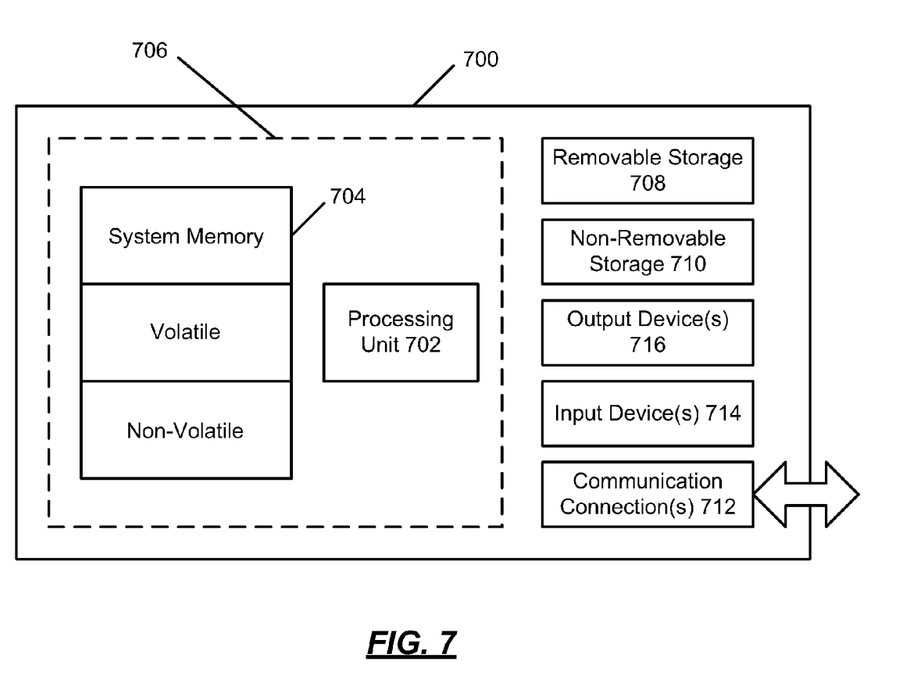
FIG. 7 shows an exemplary computing environment.

FIG. 7 shows an exemplary computing environment in which example implementations and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, PCs, server computers, handheld or laptop devices, multiprocessor systems, microprocessor-based systems, network PCs, minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 7, an exemplary system for implementing aspects described herein includes a computing device, such as computing device 700. In its most basic configuration, computing device 700 typically includes at least one processing unit 702 and memory 704. Depending on the exact configuration and type of computing device, memory 704 may be volatile (such as random access memory (RAM)), non-volatile (such as read-only memory (ROM), flash memory, etc.), or some combination of the two. This most basic configuration is illustrated in FIG. 7 by dashed line 706.

Computing device 700 may have additional features/functionality. For example, computing device 700 may include additional storage (removable and/or non-removable) including, but not limited to, magnetic or optical disks or tape. Such additional storage is illustrated in FIG. 7 by removable storage 708 and non-removable storage 710.

Computing device 700 typically includes a variety of computer readable media. Computer readable media can be any available media that can be accessed by computing device 700 and include both volatile and non-volatile media, and removable and non-removable media.

Computer storage media include volatile and non-volatile, and removable and non-removable media implemented in any method or technology for storage of information such as computer readable instructions, data structures, program modules or other data. Memory 704, removable storage 708, and non-removable storage 710 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media may be part of computing device 700.

Computing device 700 may contain communications connection(s) 712 that allow the device to communicate with other devices. Computing device 700 may also have input device(s) 714 such as a keyboard, mouse, pen, voice input device, touch input device, etc. Output device(s) 716 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the processes and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include PCs, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method of determining a route between two locations, comprising:
   receiving a start location and a destination location at a computing device;
   determining, by the computing device, an optimal route between the start location and the destination location using a map routing service of the computing device;

determining a plurality of alternative routes between the start location and the destination location by the map routing service of the computing device using the optimal route and a plurality of admissibility criteria comprising limited sharing, local optimality, and uniformly bounded stretch, wherein the limited sharing admissibility criteria is that a percentage of edges shared by the alternative route and the optimal route is less than a predetermined percentage;

ranking, by the computing device, the plurality of alternative routes using each of the plurality of admissibility criteria; and outputting the ranked plurality of alternative routes by the computing device.

2. The method of claim 1, wherein determining the alternative route comprises determining a plurality of candidate routes between the start location and the destination location and determining the admissibility of the candidate routes using the admissibility criteria.

3. The method of claim 2, further comprising pruning the plurality of candidate routes prior to determining the admissibility of the candidate routes, wherein only the admissibility of the pruned candidate routes is determined.

4. The method of claim 2, wherein if none of the candidate routes meet the admissibility criteria, then relaxing the admissibility criteria and determining the admissibility of the candidate routes using the relaxed admissibility criteria.

5. The method of claim 1, wherein limited sharing is based on an amount of a difference between the alternative route and the optimal route.

6. The method of claim 5, wherein local optimality is based on a number of detours on the alternative route.

7. The method of claim 6, wherein uniformly bounded stretch is based on a length of the shortest path between two points on the alternative route.

8. The method of claim 7, wherein the alternative route is at least y% locally optimal and the alternative route has a uniformly bounded stretch of at most z%, where y and z are predetermined threshold values.

9. A method of determining a route between two locations, comprising:

determining, by a computing device, an optimal route between a start location and a destination location using a map routing service of the computing device;

determining a plurality of single via paths between the start location and the destination location by the computing device;

evaluating the single via paths against a plurality of admissibility criteria, by the computing device, wherein the plurality of admissibility criteria includes limited sharing, and the limited sharing criteria is that a percentage of edges shared by an alternative route and the optimal route is less than a predetermined percentage;

outputting, by the computing device, a plurality of alternative routes based on the single via paths of the plurality of single via paths that are admissible with respect to the admissibility criteria, wherein the plurality of alternative routes are ranked by the computing device using each of the plurality of admissibility criteria.

10. The method of claim 9, wherein the admissibility criteria comprise limited sharing, local optimality, and stretch.

11. The method of claim 9, further comprising determining a plurality of candidate routes between the start location and the destination location, wherein determining the single via paths comprises determining via paths of the candidate routes using a plurality of via points.

12. The method of claim 11, further comprising determining the plurality of via points using a pruned bidirectional Dijkstra algorithm, wherein each via point gives a path formed by going from the start location to the via point and from the via point to the destination location along an optimal path.

13. The method of claim 9, wherein each of the single via paths is a concatenation of two shortest paths between the start location and the destination location through a vertex.

14. A system comprising:
a processor configured to:
determine a plurality of candidate routes between a start location and a destination location;

prune the candidate routes to eliminate a portion of the candidate routes;

rank the remaining candidate routes that remain after pruning based on each of a plurality of admissibility criteria; and output the highest ranked remaining candidate route that meets the plurality of admissibility criteria, wherein the admissibility criteria comprise limited sharing, local optimality, and stretch, wherein the limited sharing admissibility criteria is that a percentage of edges shared by an alternative route and the optimal route is less than a predetermined percentage.

15. The system of claim 14, wherein the processor is further configured to:
determine the optimal route between the start location and the destination location, and output the alternative route based on the highest ranked remaining candidate route that meets the admissibility criteria.

16. The system of claim 15, wherein limited sharing is based on an amount of a difference between the highest ranked remaining candidate route and the optimal route, wherein local optimality is based on an amount of detours on the highest ranked remaining candidate route, and wherein the stretch is uniformly bounded stretch and is based on a length of the shortest path between two points on the highest ranked remaining candidate route.

17. The system of claim 14, wherein, if none of the remaining candidate routes meet the admissibility criteria, the admissibility criteria is relaxed and the highest ranked remaining candidate route that meets the admissibility criteria after being relaxed is provided as an output.

18. The system of claim 14, wherein ranking the remaining candidate routes that remain after pruning comprises sorting the remaining candidate routes according to a function based on a via path of each remaining candidate route, and assigning a score to each remaining candidate route.

19. The system of claim 18, wherein each via path is a single via path that is a concatenation of two shortest paths between the start location and the destination location through a vertex.

* * * * *